US006946500B2

(12) United States Patent
Harris et al.

(10) Patent No.: US 6,946,500 B2
(45) Date of Patent: Sep. 20, 2005

(54) NON-CRYOGENIC PROCESS FOR GRINDING POLYOLEFIN DRAG REDUCING AGENTS

(75) Inventors: Jeffery R. Harris, Tulsa, OK (US); John F. Motier, Broken Arrow, OK (US)

(73) Assignee: Baker Hughes Incorporated, Houston, TX (US)

( * ) Notice: Subject to any disclaimer, the term of this patent is extended or adjusted under 35 U.S.C. 154(b) by 256 days.

(21) Appl. No.: 10/322,050

(22) Filed: Dec. 17, 2002

(65) Prior Publication Data

US 2004/0112995 A1 Jun. 17, 2004

(51) Int. Cl.[7] .................................................. C08J 3/11
(52) U.S. Cl. ...................... 523/175; 524/379; 524/389; 524/391; 524/386
(58) Field of Search ................................. 523/175, 309; 524/379, 389, 391

(56) References Cited

U.S. PATENT DOCUMENTS

| | | | |
|---|---|---|---|
| 2,879,173 A | 3/1959 | Yacoe | |
| 3,190,565 A | 6/1965 | Jayne, Jr. | |
| 3,190,585 A | * 6/1965 | Jayne, Jr. ...................... | 241/22 |
| 3,351,601 A | 11/1967 | Blaga et al. | |
| 3,452,120 A | 6/1969 | Arnold | |
| 3,528,841 A | 9/1970 | Donaldson et al. | |
| 3,632,369 A | 1/1972 | Hahn | |
| RE28,361 E | 3/1975 | Hahn | |
| 3,884,252 A | 5/1975 | Kruka | |
| 3,928,263 A | * 12/1975 | Grant ........................... | 523/309 |
| 4,016,894 A | 4/1977 | Baldwin et al. | |
| 4,066,539 A | 1/1978 | Hachisu et al. | |
| 4,147,677 A | 4/1979 | Lundberg et al. | |
| 4,177,177 A | 12/1979 | Vanderhoff et al. | |
| 4,212,312 A | 7/1980 | Titus | |
| 4,263,926 A | 4/1981 | Drake et al. | |
| 4,289,679 A | 9/1981 | Mack | |
| 4,340,076 A | 7/1982 | Weitzen | |
| 4,384,089 A | 5/1983 | Dehm | |
| 4,499,214 A | 2/1985 | Sortwell | |
| 4,510,304 A | 4/1985 | Hadermann | |
| 4,527,581 A | 7/1985 | Motier | |
| 4,550,033 A | * 10/1985 | Boutin ........................ | 427/222 |
| 4,584,244 A | 4/1986 | Fenton | |
| 4,588,640 A | 5/1986 | Matlach | |
| 4,650,126 A | 3/1987 | Feder et al. | |
| 4,659,334 A | 4/1987 | Matlach | |
| 4,693,321 A | 9/1987 | Royer | |
| 4,720,397 A | 1/1988 | O'Mara et al. | |
| 4,771,799 A | 9/1988 | Baxter et al. | |
| 4,789,383 A | 12/1988 | O'Mara et al. | |
| 4,826,728 A | 5/1989 | O'Mara et al. | |
| 4,837,249 A | 6/1989 | O'Mara et al. | |
| 5,080,121 A | 1/1992 | Malik et al. | |
| 5,165,440 A | 11/1992 | Johnston | |
| 5,165,441 A | 11/1992 | Mitchell | |
| 5,169,074 A | 12/1992 | Fauth et al. | |
| 5,244,937 A | 9/1993 | Lee et al. | |
| 5,376,697 A | * 12/1994 | Johnston et al. ............ | 523/175 |
| 5,504,131 A | 4/1996 | Smith et al. | |
| 5,504,132 A | 4/1996 | Smith et al. | |
| 5,539,044 A | 7/1996 | Dindl et al. | |
| 6,172,151 B1 | 1/2001 | Johnston et al. | |
| 6,399,676 B1 | * 6/2002 | Labude et al. .............. | 523/309 |
| 6,576,732 B1 | * 6/2003 | Milligan et al. ............ | 526/347 |
| 6,596,832 B2 | * 7/2003 | Johnston et al. ............ | 526/347 |
| 6,649,670 B1 | * 11/2003 | Harris et al. ................ | 523/175 |
| 6,765,053 B2 | 7/2004 | Labude et al. | |
| 2002/0065352 A1 | 5/2002 | Johnston et al. | |
| 2002/0198116 A1 | * 12/2002 | Eaton et al. ................ | 508/583 |
| 2003/0065054 A1 | * 4/2003 | Smith et al. ................ | 523/175 |

FOREIGN PATENT DOCUMENTS

| | | |
|---|---|---|
| CN | 675522 | 12/1963 |
| EP | 0 196 350 B1 | 10/1986 |
| EP | 0 885 259 B1 | 12/2003 |
| GB | 1439390 | 6/1976 |
| GB | 1452146 | 10/1976 |
| WO | WO 01/88031 A1 | 11/2001 |
| WO | WO 02/44280 A1 | 6/2002 |
| WO | WO 02/059183 A2 | 8/2002 |
| WO | WO 02/101282 A2 | 12/2002 |
| WO | WO 03/029330 A1 | 4/2003 |
| WO | WO 03/029331 A1 | 4/2003 |

OTHER PUBLICATIONS

C. B. Lester, "What to Expect From and How to Handle Commercially Available Drag–Reducing Agents," Oil & Gas Journal, Mar. 11, 1985, pp. 116–119.
NERAC Abstract of WO 02/085960, 2002.
PCT International Search Report for International Application No. PCT/US03/36352, Feb. 4, 2004.

\* cited by examiner

*Primary Examiner*—David W. Wu
*Assistant Examiner*—Rip A. Lee
(74) *Attorney, Agent, or Firm*—Maden, Mossman & Sriram P.C.

(57) ABSTRACT

A process for producing fine particulate polymer drag reducing agent (DRA) without cryogenic temperatures, is described. The grinding or pulverizing of polymer, such as poly(alpha-olefin) may be achieved by the use of at least one solid organic grinding aid and at least one liquid grinding aid. In one non-limiting embodiment of the invention, the grinding is conducted at ambient temperature. Examples of a solid organic grinding aid include ethene/butene copolymer particles, paraffin waxes and solid alcohols. An example of a suitable liquid grinding aid includes a blend of glycol, water and isopropyl alcohol. Particulate DRA may be produced at a size of about 500 microns or less. Use of an attrition mill is preferred.

40 Claims, No Drawings

NON-CRYOGENIC PROCESS FOR GRINDING POLYOLEFIN DRAG REDUCING AGENTS

FIELD OF THE INVENTION

The invention relates to processes for producing polymeric drag reducing agents in a finely divided particulate form, and most particularly to processes for grinding polymeric drag reducing agents to produce fine particulates thereof that do not require grinding at cryogenic temperatures.

BACKGROUND OF THE INVENTION

The use of polyalpha-olefins or copolymers thereof to reduce the drag of a hydrocarbon flowing through a conduit, and hence the energy requirements for such fluid hydrocarbon transportation, is well known. These drag reducing agents or DRAs have taken various forms in the past, including slurries or dispersions of ground polymers to form free-flowing and pumpable mixtures in liquid medium. A problem generally experienced with simply grinding the polyalpha-olefins (PAOs) is that the particles will "cold flow" or stick together after the passage of time, thus making it impossible to place the PAO in the hydrocarbon liquid where drag is to be reduced, in a form of suitable surface area, thus particle size, that will dissolve or otherwise mix with the hydrocarbon in an efficient manner. Further, the grinding process or mechanical work employed in size reduction tends to degrade the polymer, thereby reducing the drag reduction efficiency of the polymer.

One common solution to preventing cold flow during the grinding process is to coat the ground polymer particles with an anti-agglomerating agent. Cryogenic grinding of the polymers to produce the particles prior to or simultaneously with coating with an anti-agglomerating agent has also been used. However, some powdered or particulate DRA slurries require special equipment for preparation, storage and injection into a conduit to ensure that the DRA is completely dissolved in the hydrocarbon stream. The formulation science that provides a dispersion of suitable stability that it will remain in a pumpable form necessitates this special equipment.

Gel or solution DRAs (those polymers essentially being in a viscous solution with hydrocarbon solvent) have also been tried in the past. However, these drag reducing gels also demand specialized injection equipment, as well as pressurized delivery systems. The gels or the solution DRAs are stable and have a defined set of conditions that have to be met by mechanical equipment to pump them, including, but not necessarily limited to viscosity, vapor pressure, undesirable degradation due to shear, etc. The gel or solution DRAs are also limited to about 10% activity of polymer as a maximum concentration in a carrier fluid due to the high solution viscosity of these DRAs. Thus, transportation costs of present DRAs are considerable, since up to about 90% of the volume being transported and handled is inert material.

U.S. Pat. No. 2,879,173 describes a process for preparing free-flowing pellets of polychloroprene involving suspending drops of an aqueous dispersion of the polychloroprene in a volatile, water-immiscible organic liquid in which the polymer is insoluble at temperatures below −20° C. until the drops are completely frozen and the polychloroprene coagulated, separating the frozen pellets from the suspending liquid, coating them while still frozen with from 5% to 20% of their dry weight of a powder which does not react with the polychloroprene under normal atmospheric conditions, and removing the water and any adhering organic liquid through vaporization by warming the pellets.

A method for coating pellets of a normally sticky thermoplastic binder material by using a mixture of a minor proportion of a vinyl chloride/vinyl acetate copolymer and a major proportion of a chlorinated paraffin wax with powdered limestone or talc powder is described in U.S. Pat. No. 3,351,601.

U.S. Pat. No. 3,528,841 describes the use of microfine polyolefin powders as parting agents to reduce the tackiness of polymer pellets, particularly vinyl acetate polymers and vinyl acetate copolymers.

Similarly, Canadian patent 675,522 involves a process of comminuting elastomeric material for the production of small particles that includes presenting a large piece of elastomeric material to a comminuting device, feeding powdered resinous polyolefin into the device, comminuting the elastomeric material in the presence of the powdered polyolefin and recovering substantially free-flowing comminuted elastomeric material.

A process for reducing oxidative degradation and cold flow of polymer crumb by immersing the crumb in a non-solvent such as water and/or dusting the crumb with a powder such as calcium carbonate and 2,6-di-t-butylparacresol, 4,4'-methylene-bis-(2,6-di-t-butylphenol) or other antioxidants is discussed in U.S. Pat. No. 3,884,252. The patent also mentions a process for reducing fluid flow friction loss in pipeline transmission of a hydrocarbon fluid by providing a continuous source of the dissolved polymer.

U.S. Pat. No. 4,016,894 discloses that drag in turbulent aqueous streams is reduced by a powder composition of a finely divided hygroscopic drag reducing powder, for example poly(ethylene oxide), and a colloidal size hydrophobic powder, for example, an organo silicon modified colloidal silica, and an inert filler such as sodium sulfate. The powder composition is injected into the turbulent stream by first mixing the powder with water to form a slurry and immediately thereafter drawing the slurry through an eductor into a recycle stream between the downstream and upstream ends of a pump for the turbulent stream.

A polymer emulsification process comprising intimately dispersing a liquified water insoluble polymer phase in an aqueous liquid medium phase containing at least one nonionic, anionic or cationic oil-in-water functioning emulsifying agent, in the presence of a compound selected from the group consisting of those hydrocarbons and hydrocarbyl alcohols, ethers, alcohol esters, amines, halides and carboxylic acid esters which are inert, non-volatile, water insoluble, liquid and contain a terminal aliphatic hydrocarbyl group of at least about 8 carbon atoms, and mixtures thereof are described in U.S. Pat. No. 4,177,177. The resulting crude emulsion is subjected to the action of comminuting forces sufficient to enable the production of an aqueous emulsion containing polymer particles averaging less than about 0.5 microns in size.

U.S. Pat. No. 4,263,926 provides a method and apparatus for maintaining polymer particles in readily recoverable, discrete form, and for injecting the particles into a pipeline hydrocarbon by disposing particulate polymer within a storage hopper having a cone bottom and an auger extending upwardly from the bottom. The auger is rotated to cause the polymer particles to revolve in the hopper, reversing the rotation of the auger to pass polymer particles downwardly into a mixing chamber below the hopper. The particles pass through a rotary metering valve, or optionally, a bin activator, intermediate storage and rotary metering valve at the upper end of the chamber, simultaneously spraying a liquid such as oil or water tangentially in the chamber optionally agitating the chamber and removing a slurry of particulate polymer and liquid from the chamber and injecting the slurry into a pipeline hydrocarbon.

A technique for extremely rapid dissolution or dispersion on essentially the molecular level, of certain polymeric materials in compatible liquid vehicles is described in U.S. Pat. No. 4,340,076. The polymeric materials are comminuted at cryogenic temperatures and are then introduced into a liquid vehicle preferably while still at or near cryogenic temperatures. At low concentrations, the resulting blend or system displays reduced friction to flow while high concentrations may be used to immobilize the liquid vehicle and/or reduce its vapor pressure.

From reviewing the many foregoing prior patents it can be appreciated that considerable resources have been spent on both chemical and physical techniques for easily and effectively delivering drag reducing agents to the fluid that will have its friction reduced. Yet none of these prior methods has proven entirely satisfactory. Thus, it would be desirable if a drag reducing agent could be developed which rapidly dissolves in the flowing hydrocarbon (or other fluid), which could minimize or eliminate the need for special equipment for preparation and incorporation into the hydrocarbon, and which could be formulated to contain much greater than 10% polymer. It would also be desirable to have a process for producing particulate drag reducing agent that did not require cryogenic grinding in its preparation and/or only grinding under ambient temperature conditions.

SUMMARY OF THE INVENTION

An object of the invention is to provide a process for producing a particulate polymer drag reducing agent of suitable small particle size and adequate surface area that will readily dissolve and dissipate in flowing hydrocarbon streams.

Other objects of the invention include providing a particulate polymer DRA that can be readily manufactured and which does not require cryogenic temperatures to be produced.

Another object of the invention is to provide a particulate polymer DRA that does not cold flow upon standing once it is made.

In carrying out these and other objects of the invention, there is provided, in one form, a method for producing a particulate polymer drag reducing agent that involves feeding to a mill components including granulated polymer, at least one solid organic grinding aid, and optionally at least one liquid grinding aid. The components are then ground to produce particulate polymer drag reducing agent. In one non-limiting embodiment of the invention, cryogenic temperatures are not used in the process. In another aspect of the invention, the invention includes the particulate polymer drag reducing agent made by this process.

DETAILED DESCRIPTION OF THE INVENTION

A process has been discovered by which attrition mill pulverizing technology can be utilized in combination with a blend of unique grinding aids to render a granulated polyolefin polymer into a ground state of fine particles of 600 microns or less at non-cryogenic conditions. The process preferably involves the injection of atomized liquid grinding aid (composed of wetting properties such that lubricity is imparted to the grinding system) in unison with the introduction of organic solid grinding aid into the grinding chamber such that particle agglomeration and gel ball formation of soft polyolefins is minimized or prevented. The solid grinding aid is also required to provide the shearing action necessary in the grinding or pulverizing chamber to achieve the small polymer particles of about 600 microns or less. Use of a single grinding aid such as the wetting agent, produces particle sizes on the order of 1200 microns or greater. In the case of solid grinding aid used alone in the process, large gel ball formation occurs that prevents the grinding to a small particle size. It has been found that the solid grinding aid can be utilized as the primary and only grinding aid in the process. However, that process is restricted in achieving the smaller particle size distributions and is also limited in the speed by which the process may be run. One can grind faster and smaller by a combination of the two grinding aid types. Nevertheless, in some embodiments of the invention, where the DRA polymer is relatively harder, it may not be necessary to use a liquid grinding aid. Where the DRA polymer is relatively softer, a liquid grinding aid of the invention may be beneficial. Thus, the use of a liquid grinding aid is in part dependent upon the work required, which is a function of the $T_g$ (softness/hardness) of the polymer.

In one non-limiting embodiment of this invention, the grinding for producing particulate polymer drag reducing agent is conducted at non-cryogenic temperatures. For the purposes of this invention, cryogenic temperature is defined as the glass transition temperature ($T_g$) of the particular polymer having its size reduced or being ground, or below that temperature. It will be appreciated that $T_g$ will vary with the specific polymer being ground. Typically, $T_g$ ranges between about −10° C. and about −100° C. (about 14° F. and about −148° F.), in one non-limiting embodiment. In another non-limiting embodiment of the invention, the grinding for producing particulate polymer drag reducing agent is conducted at ambient temperature. For the purposes of this invention, ambient temperature conditions are defined as between about 20–25° C. (about 68–77° F.). In another non-limiting embodiment of the invention, ambient temperature is defined as the temperature at which grinding occurs without any added cooling. Because heat is generated in the grinding process, "ambient temperature" may thus in some contexts mean a temperature greater than about 20–25° C. (about 68–77° F.). In still another non-limiting embodiment of the invention, the grinding to produce particulate polymer drag reducing agent is conducted at a chilled temperature that is less than ambient temperature, but that is greater than cryogenic temperature for the specific polymer being ground. A preferred chilled temperature may range from about −7 to about 2° C. (about 20 to about 35° F.).

If the liquid grinding aid is added in small quantities (small doses are generally the most effective), then the action of the liquid is not to aid in the shearing mechanism, but rather to aid in the lubricity of the recirculating, pulverizing system such that hot spots due to mechanical shear are greatly reduced or eliminated. If mechanical shearing forces are too great (temperature rise with higher shear) and the polymer experiences instantaneous points of high heat, then gel balls form quite readily (soft polymer agglomerates). Also, without the addition of the liquid grinding aid in small quantities, rubbery polymer tends to build up on pulverizing blade surfaces. Again, lubricity of the system plays a key role in maintaining an efficient grinding operation; an efficient system as defined by a smooth flowing recirculating/ pulverizing operation with little polymer build-up on metal surfaces, lack of gel ball formation, and in conjunction with suitable production rates. Suitable production rates include, but are not necessarily limited to, a minimum of 100 to an upper rate of about 300 lbs. per hour or more (45–136 kg/hr).

On the other hand, if too much of the liquid grinding aid is injected into the pulverizing operation, production rates are slowed due to the build up of surface tension (high surface tension imparted by the liquid grinding aid) on the shaker screens by which ground polymer exits. If such conditions exist, then one must add solid grinding aid to dry or absorb some of the liquid, reduce surface tension, and increase throughput. In non-limiting embodiments of the invention, the liquid grinding aid is sprayed, atomized or otherwise injected onto the granulated polymer in relatively small quantities.

Generally, the polymer that is processed in the method of this invention may be any conventional or well known polymeric drag reducing agent (DRA) including, but not necessarily limited to, poly(alpha-olefin), polychloroprene, vinyl acetate polymers and copolymers, poly(alkylene oxide), and mixtures thereof and the like. For the method of this invention to be successful, the polymeric DRA would have to be of sufficient structure (molecular weight) to exist as a neat solid which would lend itself to the pulverizing process, i.e. that of being sheared by mechanical forces to smaller particles. A DRA of a harder, solid nature (relatively higher glass transition temperature) than poly(alpha-olefin) would certainly work. A DRA of a relatively softer nature (lower glass transition temperature, more rubbery polymer) would be more difficult to pulverize by this process. A DRA that exists as dissolved in solution (gel polymers) would have no applicability here, of course.

Further details about continuously polymerizing DRA polymers may be found in U.S. Pat. No. 6,649,670 B1, incorporated by reference herein.

Utilization of the liquid grinding aid in accordance with the inventive method allows one to pulverize softer polymers of any structure, up to a point. However, some polymers would be too soft, and the softening temperatures of the polymers would be reached quickly under shear, and agglomeration could not be prevented. Also, due to the differing chemical structures and surface energy wetting properties, one may not be able to find an appropriate liquid grinding aid that would lend lubricity to the pulverizing operation. For example, rubbery polysiloxanes could not be wetted to any significant extent or degree with glycolic mixtures and thus would tend to agglomerate with increased heat buildup rather than wet and slip past one another.

Poly(alpha-olefin) is a preferred polymer in one non-limiting embodiment of the invention. Poly(alpha-olefins) (PAOs) are useful to reduce drag and friction losses in flowing hydrocarbon pipelines and conduits. Prior to the process of this invention, the polymer has already been granulated, that is, broken up or otherwise fragmented into granules in the range of about 6 mm to about 20 mm, preferably from about 8 mm to about 12 mm. It is permissible for the granulated polymer to have an anti-agglomeration agent thereon. Such anti-agglomeration agents include, but are not necessarily limited to talc, alumina, ethylene bis-stearamide, and the like and mixtures thereof Within the context of this invention, the term "granulate" refers to any size reduction process that produces a product that is relatively larger than that produced by grinding. Further within the context of this invention, "grinding" refers to a size reduction process that gives a product relatively smaller than that produced by "granulation". "Grinding" may refer to any milling, pulverization, attrition, or other size reduction that results in particulate polymer drag reducing agents of the size and type that are the goal of the invention.

While grinding mills, particularly attrition mills such as Pallmann attrition mills, Munson centrifugal impact mills, Palmer mechanical reclamation mills, etc. may be used in various non-limiting embodiments of the invention, other grinding machines may be used in the method of this invention as long as the stated goals are achieved.

The solid organic grinding aid may be any finely divided particulate or powder that inhibits, discourages or prevents particle agglomeration and/or gel ball formation during grinding. The solid organic grinding aid may also function to provide the shearing action necessary in the pulverizing or grinding step to achieve polymer particles of the desired size. The solid organic grinding aid itself has a particle size, which in one non-limiting embodiment of the invention ranges from about 1 to about 50 microns, preferably from about 10 to about 50 microns. Suitable solid organic grinding aids include, but are not necessarily limited to, ethene/butene copolymer (such as Microthene, available from Equistar, Houston), paraffin waxes (such as those produced by Baker Petrolite), solid, high molecular weight alcohols (such as Unilin alcohols available from Baker Petrolite), and any non-metallic, solid compounds composed of C and H, and optionally N and/or S which can be prepared in particle sizes of 10–50 microns suitable for this process, and mixtures thereof. Talc and ethylene bis-stearamide were discovered to be ineffective as a solid, organic grinding aid. The solid organic grinding aid has an absence of fatty acid waxes.

The liquid grinding aid provides lubricity to the system during grinding. Suitable liquid grinding aids include any which impart lubricity to the surface of the polymer being ground. Specific examples include, but are not necessarily limited to, a blend of a glycol with water and/or an alcohol. Suitable glycols include, but are not necessarily limited to, ethylene glycol, propylene glycol, diethytene glycol, dipropylene glycol, methyl ethers of such glycols, and the like, and mixtures thereof. Suitable alcoholic liquids include, but are not necessarily limited to, methanol, ethanol, isopropanol (isopropyl alcohol, IPA), and the like and mixtures thereof. Liquid grinding aids that are non-harmful to the environment are particularly preferred. In a particularly preferred embodiment of the invention, the liquid grinding aid is the blend of glycol, water and IPA. The proportions of the three components in this blend may range from about 20 to 80 wt. % to about 20 to 80 wt. % to about 0 to 30 wt. %, preferably from about 20 to 80 wt. % to about 20 to 80 wt. % to about 0 to 20 wt. %. In one non-limiting embodiment of the invention, the liquid grinding aid is atomized or sprayed into the grinding or pulverizing chamber and/or onto the polymer granules as they are fed to the chamber.

It will be appreciated that there will be a number of different specific ways in which the invention may be practiced that are within the scope of the invention, but that are not specifically described herein. For instance, in one non-limiting embodiment of the invention, the granulated polymer is fed into the grinding chamber at a rate of from about 100 to about 300 lbs/hr (45–136 kg/hr), the solid organic grinding aid is fed at a rate of from about 10 to about 90 lb/hr (4.5–41 kg/hr), and the liquid grinding aid is fed at a rate of from about 0.01 to about 0.5 gallons per minute (0.04–1.9 liters per minute). Preferably, the granulated polymer is fed into the grinding chamber at a rate of from about 200 to about 300 lb/hr (91–136 kg/hr), the solid organic grinding aid is fed at a rate of from about 10 to about 30 lb/hr (4.5–14 kg/hr), and the liquid grinding aid is fed at a rate of from about 0.01 to about 0.1 gallons per minute (0.04–0.4 liters per minute). As noted, all of the components may be fed simultaneously to the grinding chamber. Alternatively, the components may be mixed together prior to being fed to the grinding chamber. In another non-limiting embodiment of the invention, the components are added sequentially, in no particular order or sequence. Stated another way, the ratio of solid organic grinding aid to liquid grinding aid (on a weight/weight basis) may range from about 0.15 to about 0.45 pound per pound of polymer (kg/kg), preferably from about 0.2 to about 0.3 pound per pound of polymer (kg/kg). Grinding speeds of up to 3600 rpm were utilized in a Pallmann PKM-600 model for a single rotating disk, and 3600, 5000 rpm, respectively, utilized in a Universal mill fitted with counter-rotating disks, were found to be acceptable in specific, non-limiting embodiments of the invention.

In one non-limiting embodiment of the invention, it is expected that the processes described herein will produce particulate polymer drag reducing agent product where average particle size is less than about 600 microns, preferably where at least 90 wt % of the particles have a size of less than about 600 microns or less, 100 wt. percent of the particles have a size of 500 microns or less, and most preferably 61.2 wt. % of the particles have a size of 297 microns or less in non-limiting embodiments. One achievable distribution is shown in Table I utilizing a PKM-600 model grinder; a series of other particle distributions vs. the screen size is displayed in Table II with the Universal Mill. The variable screen sizes were changed out within in the collection device during numerous grinds in the Universal Mill.

TABLE I

| Micron Retained | Screen Mesh Size | Percent |
| --- | --- | --- |
| 500 | 35 | 38.8 g |
| 297 | 50 | 55.7 g |
| 210 | 70 | 4.1 g |
| 178 | 80 | 0.4 g |
| 150 | 100 | 0.4 g |
| pan | pan | 0.6 g |

TABLE II

| Particle Size (microns) | 35 Mesh Screen | 30 Mesh Screen | 20 Mesh Screen |
| --- | --- | --- | --- |
| 800 | 5 | 2 | 2 |
| 700 | | | |
| 600 | | | 17 |
| 500 | 4 | 11 | 18 |
| 400 | 35 | 27 | 20 |
| 200 | 35 | 32 | 24 |
| 100 | 14/7 | 16/12 | 11/8 |

It is expected that the resulting particulate polymer DRAs can be easily transported without the need of including an inert solvent, and that the particulate polymer DRAs can be readily inserted into and incorporated within a flowing hydrocarbon, aqueous fluid, oil-in-water emulsion or water-in-oil emulsion, as appropriate. DRA products made by the process of this invention are free-flowing and contain a high percentage, from about 70–80% of active polymer. Furthermore, there is an absence of any need to add an anti-agglomeration aid to the DRA after it is ground to its desirable size. If the balance of liquid grinding aid and solid grinding aid is properly optimized, any excess liquid grinding aid is absorbed by the solid grinding aid.

The invention will now be further described with respect to specific examples that are provided only to further illustrate the invention and not limit it in any way.

EXAMPLE 1

A lubricating mixture of glycol/water/IPA in a 60/20/20 volume ratio was injected via atomization into a Pallmann PKM-600 grinder followed by granulated poly(alpha-olefin). The volume of fluid (3–4 gallons per minute, gpm; about 11 to 15 liters per minute, lpm) atomized into the grinding chamber, however, along with an initially relatively low polymer feed rate proved too great in that the polymer was lubricated to the point where the particles were simply squeezed right through the blades without seeing any significant shearing action. After about 30–45 minutes of grinding action, there was a failure to see any reduction in size from the chunky particles that were being recirculated in the closed loop system. The space between the blades was 2 mm.

EXAMPLE 2

In another example, the distance between the blades in a PKM-600 model was mechanically reduced to 1.7 mm and the flow rate of lubricating fluid cut in half. Again, upon start-up the amount of lubricating fluid was too great to allow grinding (lack of adequate shear forces, too much lubricity) to the desired smaller sizes. Thus, the addition of fluid was reduced by 50%, while polymer was added with some additional Microthene. The total Microthene feed rate was from about 20–30% based on the total dry feed rate. As the addition of new polymer absorbed the lubricating fluid the system became drier, and the polymer began to be ground to a finer particle size. This change in the composition of the mixture put a greater load on the grinding apparatus, thus adding more shear to the process. As the grinding progressed, the particle size was gauged by sieve screens initially as a 1200 micron particle, then to a 800 micron size and finally to a 500 micron size where the polymer began to come through the 35 mesh screen (500 micron screen) in the shaker device to be further collected in a drum.

As the addition of Microthene, polymer and liquid grinding aid continued, at some point all the liquid agent was absorbed and the system (under constant recirculation) became very dry. It quickly became apparent that significant amounts (estimated at about 5–10% of the product) of small gel balls were being formed in the system and were not being re-ground as the large particle sizes were recirculated. The temperature also increased during this period from 80° F. (27° C.) to 94° F. (34° C.).

It was also during this "dry grinding" period that the operators became overly aggressive in the feed rate of polymer added to the grinder, which eventually led to a large polymer "basketball-sized" formation that torqued the grinder to a halt. The same type of polymer agglomeration or ball formation had been experienced in previous experimental cryogenic grinds with poly(alpha-olefin) when trying to push the grinding rate. Thus, this agglomeration was not unexpected and justified the utilization of the liquid grinding aid to prevent such agglomeration or balling.

EXAMPLE 3

Poly(alpha-olefin) C6/C12 30/70 molar ratio copolymer was ground with a Pallmann PKM-600 model grinder at 3600 rpm combined with an ethene/butene copolymer blocking agent (Microthene from Equistar in Houston). Temperatures of 90 F (32° C.) were reached in the grinding chamber. A maximum grinding rate of 120 lbs per hour (54.4 kg/hr) was achieved before the cyclone system began to back up with excess polymer. The poly(alpha-olefin) was not moving through the Sweko shaker fast enough, which in turn loaded up the system to where it backed up. It was theorized that high surface tension combined with the high frequency of the shaker simply held the particles on top of the shaker screen. Additionally, the cyclone tubing heated up to about 11° F. (43° C.) to the extent that more fluid had to be added to prevent gel balls. Adding more fluid kept down the gel ball formation, however it also lowered the production rate. The temperature of the grinding chamber averaged 94° F. (34° C.).

Later, the Sweko shaker was replaced with a Great Western shaker. The Western shaker had 5–6 screens in it that effectively doubled the screen space (surface area) thereby enhancing the production rate. After grinding was again initiated, the maximum rate of 160 lbs/hour (72.3 kg/hr) was achieved before the cyclone began to back up again. Mounting an air exchanger on the back side of the system and feeding it off of a chiller solved the heating problem. Later optimization of this system with an improved cyclone unit brought production rates up to about 200 to 250 lbs/hour (91 to 113 kg/hr).

A conclusion is that to effectively use the ambient grinding technology to pulverize or grind the soft poly(alpha-olefin), a combination of lubricating fluid and solid grinding aid should be utilized. The liquid wetting agent may be added at a minimum rate (probably about 0.1 to 0.5 gpm (0.4 to 1.9 liters per minute) in Example 2) such that the lubricity in the system prevents the formation of gel balls. The wetting agent will also greatly enhance the ability to push the feed rate upward without fear of large scale agglomeration. At the same time, some minimum solid grinding aid is needed to enhance the shearing action in the blade area such that small particle sizes (about 500 microns or less) are achieved. The solid grinding aid is also needed to prevent the blinding of screens in the shaker/collection device. If the polymer is too wet in the recirculating loop, the particles simply "blind out" on the shaker and do not come through the small screen sizes (35 mesh; 500 microns) to the collection drum below.

Many modifications may be made in the composition and process of this invention without departing from the spirit and scope thereof that are defined only in the appended claims. For example, the exact nature of and proportions of polymer, solid organic grinding aid, and liquid grinding aid may be different from those used here. Particular processing techniques may be developed to enable the components to be homogeneously blended and work together well, yet still be within the scope of the invention. Additionally, feed rates of the various components are expected to be optimized for each type of grinding equipment and for each combination of components employed.

We claim:

1. A method for producing a particulate polymer drag reducing agent, comprising:
   feeding to a mill components comprising:
      granulated polymer;
      at least one solid organic grinding aid; and
      a liquid grinding aid; and
   grinding the components to produce particulate polymer drag reducing agent.

2. The method of claim 1 where in the feeding, the granulated polymer has a size between about 8 mm and about 12 mm.

3. The method of claim 1 where in the feeding, the granulated polymer is poly(alpha-olefin).

4. The method of claim 1 where in the feeding, the solid organic grinding aid has a size between about 1 and about 50 microns.

5. The method of claim 1 where in the feeding, the solid organic grinding aid is selected from the group consisting of ethene/butene copolymer, paraffin waxes, solid alcohols, and mixtures thereof.

6. The method of claim 1 where in the feeding, the liquid grinding aid is a blend of at least one glycol selected from the group consisting of ethylene glycol, propylene glycol, diethylene glycol, dipropylene glycol, methyl ethers of such glycols, and mixtures thereof, and at least one other liquid selected from the group consisting of water and at least one alcohol, the alcohol being selected from the group consisting of methanol, ethanol, isopropanol and mixtures thereof.

7. The method of claim 1 where in the feeding, the liquid grinding aid is a blend of ethylene glycol, water and isopropanol where the proportions range from about 20 to 80 wt. % to about 20 to 80 wt. % to about 0 to 30 wt. %.

8. The method of claim 1 where in the feeding, the granulated polymer is fed at a rate of from about 100 to about 300 lbs/hr (45–138 kg/hr) the solid organic grinding aid is fed at a rate of from about 10 to about 90 lbs/hr (4.5–41 kg/hr) and the liquid grinding aid is fed at a rate of from about 0.01 to about 0.5 gallons per minute (from about 0.04 to about 1.9 lpm).

9. The method of claim 1 where in the grinding the particulate polymer drag reducing agent has an average particle size of about 600 microns or less.

10. The method of claim 1 where the feeding and grinding are conducted in the absence of cryogenic temperatures.

11. The method of claim 1 where the feeding and grinding are conducted at ambient temperatures.

12. A method for producing a particulate polymer drag reducing agent, comprising:
   feeding to a mill components comprising:
      granulated polymer;
      at least one solid organic grinding aid; and
      at least one liquid grinding aid; and
   grinding the components to produce at least 90 wt. % of the particulate polymer drag reducing agent having a size of about 600 microns or less, where the feeding and grinding are conducted in the absence of cryogenic temperatures.

13. The method of claim 12 where in the feeding, the granulated polymer is poly(alpha-olefin).

14. The method of claim 12 where in the feeding, the solid organic grinding aid has a size between about 1 and about 50 microns.

15. The method of claim 12 where in the feeding, the solid organic grinding aid is selected from the group consisting of ethene/butene copolymer, paraffin waxes, solid alcohols, and mixtures thereof.

16. The method of claim 12 where in the feeding, the liquid grinding aid is a blend of at least one glycol selected from the group consisting of ethylene glycol, propylene glycol, diethylene glycol, dipropylene glycol, methyl ethers of such glycols, and mixtures thereof, and at least one other liquid selected from the group consisting of water and at least one alcohol, the alcohol being selected from the group consisting of methanol, ethanol, isopropanol and mixtures thereof.

17. The method of claim 12 where in the feeding, the liquid grinding aid is a blend of glycol, water and isopropyl alcohol where the proportions range from about 20 to 80 wt. % to about 20 to 80 wt. % to about 0 to 30 wt. %.

18. The method of claim 12 where in the feeding, the granulated polymer is fed at a rate of from about 100 to about 300 lbs/hr (45–138 kg/hr) the solid organic grinding aid is fed at a rate of from about 10 to about 90 lbs/hr (4.5–41 kg/hr) and the liquid grinding aid is fed at a rate of from about 0.01 to about 0.5 gallons per minute (from about 0.04 to about 1.9 lpm).

19. A particulate polymer drag reducing agent (DRA) produced by a method comprising:
   feeding to a mill components comprising:
      granulated polymer;
      at least one solid organic grinding aid; and
      a liquid grinding aid; and
   grinding the components to produce particulate polymer drag reducing agent.

20. The particulate polymer DRA of claim 19 where in the feeding, the granulated polymer has a size between about 8 mm and about 12 mm.

21. The particulate polymer DRA of claim 19 where in the feeding, the granulated polymer is poly(alpha-olefin).

22. The particulate polymer DRA of claim 19 where in the feeding, the solid organic grinding aid has a size between about 1 and about 50 microns.

23. The particulate polymer DRA of claim 19 where in the feeding, the solid organic grinding aid is selected from the group consisting of ethene/butene copolymer, paraffin waxes, solid alcohols, and mixtures thereof.

24. The particulate polymer DRA of claim 19 where in the feeding, the liquid grinding aid is a blend of at least one glycol selected from the group consisting of ethylene glycol, propylene glycol, diethylene glycol, dipropylene glycol, methyl ethers of such glycols, and mixtures thereof, and at least one other liquid selected from the group consisting of water and at least one alcohol, the alcohol being selected from the group consisting of methanol, ethanol, isopropanol and mixtures thereof.

25. The particulate polymer DRA of claim 19 where in the feeding, the liquid grinding aid is a blend of ethylene glycol, water and isopropanol where the proportions range from about 20 to 80 wt. % to about 20 to 80 wt. % to about 0 to 30 wt. %.

26. The particulate polymer DRA of claim 19 where in the feeding, the granulated polymer is fed at a rate of from about 100 to about 300 lbs/hr (45–136 kg/hr) the solid organic grinding aid is fed at a rate of from about 10 to about 90 lbs/hr (4.5–41 kg/hr) and the liquid grinding aid is fed at a rate of from about 0.01 to about 0.5 gallons per minute (from about 0.04 to about 1.9 lpm).

27. The particulate polymer DRA of claim 19 where in the grinding the particulate polymer drag reducing agent has an average particle size of about 600 microns or less.

28. The particulate polymer DRA of claim 19 where the feeding and grinding are conducted in the absence of cryogenic temperatures.

29. The particulate polymer DRA of claim 19 where the feeding and grinding are conducted at ambient temperatures.

30. A particulate polymer drag reducing agent (DRA) produced by a method comprising:
   feeding to a mill components comprising:
      granulated polymer;
      at least one solid organic grinding aid; and
      at least one liquid grinding aid; and
   grinding the components to produce at least 90 wt % of the particulate polymer drag reducing agent having a size of about 600 microns or less, where the feeding and grinding are conducted in the absence of cryogenic temperatures.

31. The particulate polymer DRA of claim 30 where in the feeding, the granulated polymer is poly(alpha-olefin).

32. The particulate polymer DRA of claim 30 where in the feeding, the solid organic grinding aid has a size between about 1 and about 50 microns.

33. The particulate polymer DRA of claim 30 where in the feeding, the solid organic grinding aid is selected from the group consisting of ethene/butene copolymer, paraffin waxes, solid alcohols, and mixtures thereof.

34. The particulate polymer DRA of claim 30 where in the feeding, the liquid grinding aid is a blend of at least one glycol selected from the group consisting of ethylene glycol, propylene glycol, diethylene glycol, dipropylene glycol, methyl ethers of such glycols, and mixtures thereof, and at least one other liquid selected from the group consisting of water and at least one alcohol, the alcohol being selected from the group consisting of methanol, ethanol, isopropanol and mixtures thereof.

35. The particulate polymer DRA of claim 30 where in the feeding, the liquid grinding aid is a blend ethylene glycol, water and isopropanol where the proportions range from about 20 to 80 wt. % to about 20 to 80 wt. % to about 0 to 30 wt. %.

36. The particulate polymer DRA of claim 30 where in the feeding, the granulated polymer is fed at a rate of from about 100 to about 300 lbs/hr (45–136 kgs/hr) the solid organic grinding aid is fed at a rate of from about 10 to about 90 lbs/hr (4.5–41 kg/hr) and the liquid grinding aid is fed at a rate of from about 0.01 to about 0.5 gallons per minute (from about 0.04 to about 1.9 lpm).

37. A method of reducing drag in a hydrocarbon stream comprising:
   producing a particulate polymer drag reducing agent, comprising:
      feeding to a mill components comprising:
         granulated polymer;
         at least one solid organic grinding aid; and
         a liquid grinding aid; and
      grinding the components to produce particulate polymer drag reducing agent; and
   introducing the particulate polymer drag reducing agent into the hydrocarbon stream.

38. A method for producing a particulate polymer drag reducing agent, comprising:
   feeding to a mill components comprising:
      granulated polymer; and
      at least one solid organic grinding aid having a size between about 1 and about 50 microns; and
   grinding the components to produce particulate polymer drag reducing agent.

39. A particulate polymer drag reducing agent (DRA) produced by a method comprising:
   feeding to a mill components comprising:
      granulated polymer;
      at least one solid organic grinding aid having a size between about 1 and about 50 microns; and
   grinding the components to produce particulate polymer drag reducing agent.

40. A method of reducing drag in a hydrocarbon stream comprising:
   producing a particulate polymer drag reducing agent, comprising:
      feeding to a mill components comprising:
         granulated polymer;
         at least one solid organic grinding aid having a size between about 1 and about 50 microns; and
      grinding the components to produce particulate polymer drag reducing agent; and
   introducing the particulate polymer drag reducing agent into the hydrocarbon stream.

* * * * *

UNITED STATES PATENT AND TRADEMARK OFFICE
CERTIFICATE OF CORRECTION

PATENT NO.       : 6,946,500 B2
APPLICATION NO.  : 10/322050
DATED            : September 20, 2005
INVENTOR(S)      : Jeffery R. Harris and John F. Motier Page 1 of 1

It is certified that error appears in the above-identified patent and that said Letters Patent is hereby corrected as shown below:

Column 6, line 42, delete "diethytene" and insert -- diethylene --.

Signed and Sealed this

Twenty-first Day of November, 2006

JON W. DUDAS
*Director of the United States Patent and Trademark Office*